Sept. 10, 1929.  L. OLSEN  1,727,935
GAS METER
Filed Sept. 10, 1926  3 Sheets-Sheet 1
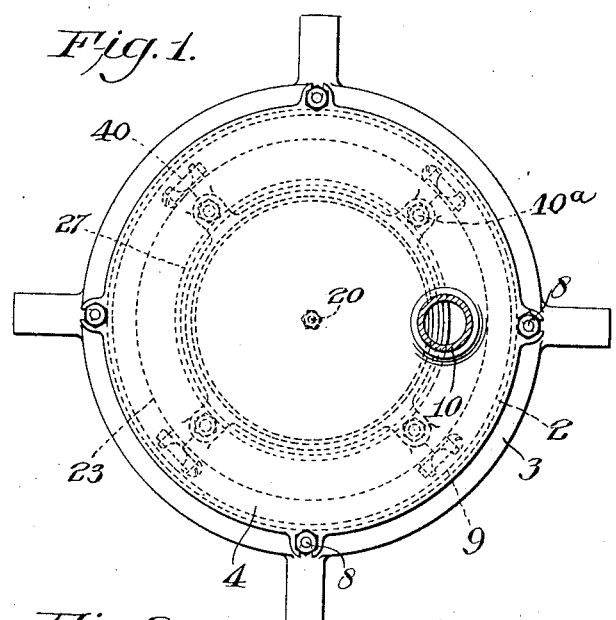
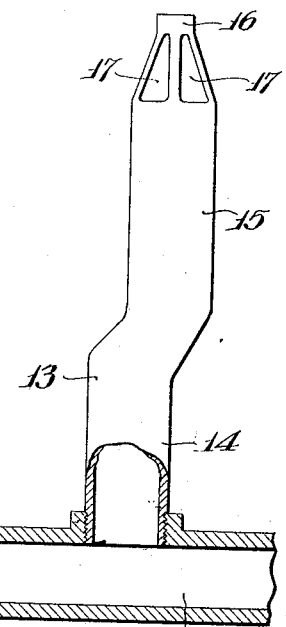
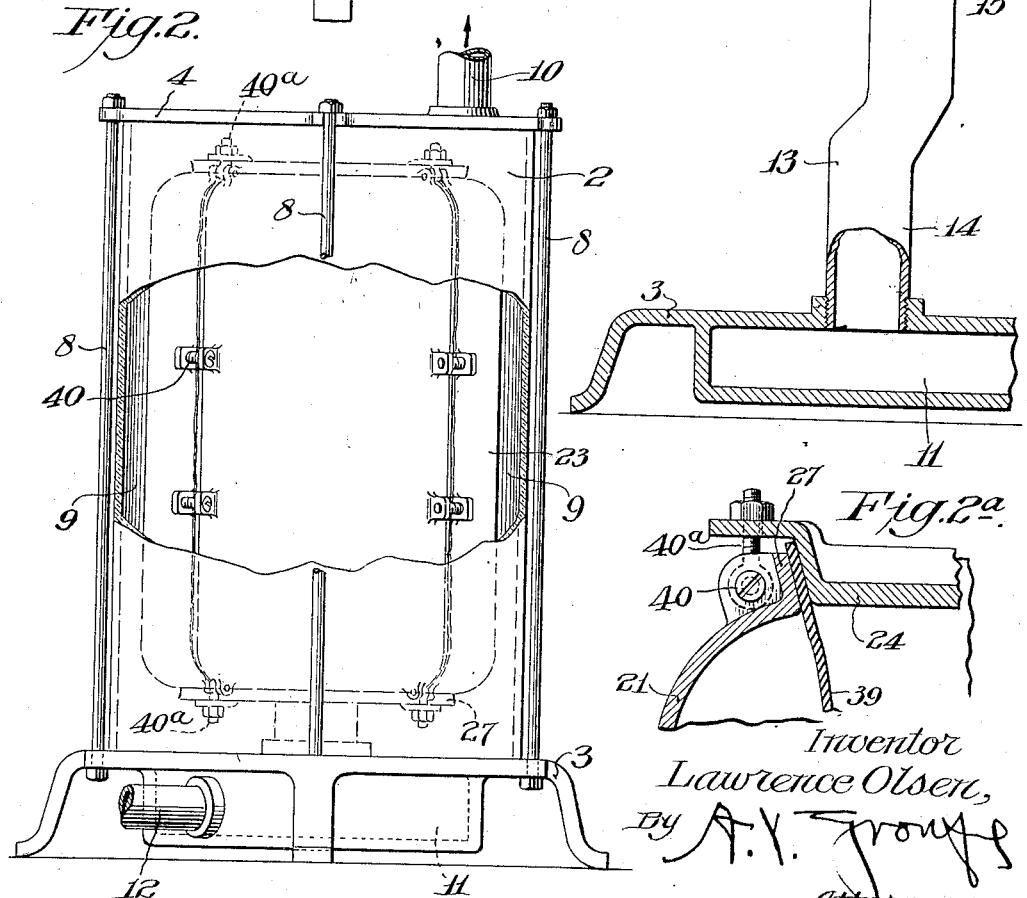
Inventor
Lawrence Olsen,
By A. V. Groupp
Attorney.

Sept. 10, 1929.  L. OLSEN  1,727,935
GAS METER
Filed Sept. 10, 1926    3 Sheets-Sheet 2

Inventor
Lawrence Olsen,
By A. V. Trout
Attorney.

Sept. 10, 1929.  L. OLSEN  1,727,935

GAS METER

Filed Sept. 10, 1926  3 Sheets-Sheet 3

Inventor
Lawrence Olsen,
By A. V. Groupt
Attorney.

Patented Sept. 10, 1929.

1,727,935

UNITED STATES PATENT OFFICE.

LAWRENCE OLSEN, OF PHILADELPHIA, PENNSYLVANIA.

GAS METER.

Application filed September 10, 1926. Serial No. 134,620.

The object of this invention is to provide a gas meter of novel, simple and efficient construction which will operate successfully in any position; which may be operated at relatively high speed and at the same time preserve the pressure on the discharge side of the meter; and, which will be inexpensive in manufacture, installation and maintenance.

With the foregoing and related objects in view the invention consists of the elements and the combinations of them hereinafter described and claimed.

In the accompanying drawings illustrating the invention,

Figure 1 is a plan view of my improved meter showing the gas outlet pipe in section.

Figure 2 is a side view of the meter showing the outer casing partly broken away.

Figure 2ª is a sectional detail showing the securing means for the end heads of the casing member.

Figure 3 is a sectional detail showing a portion of the gas inlet chamber and the gas pipe extending upwardly therefrom.

Figure 4:
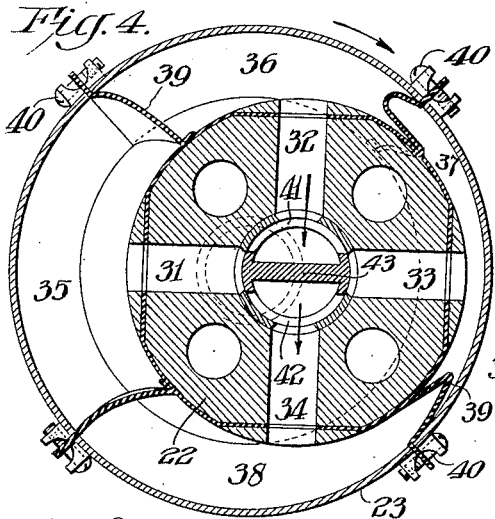
Figure 5:
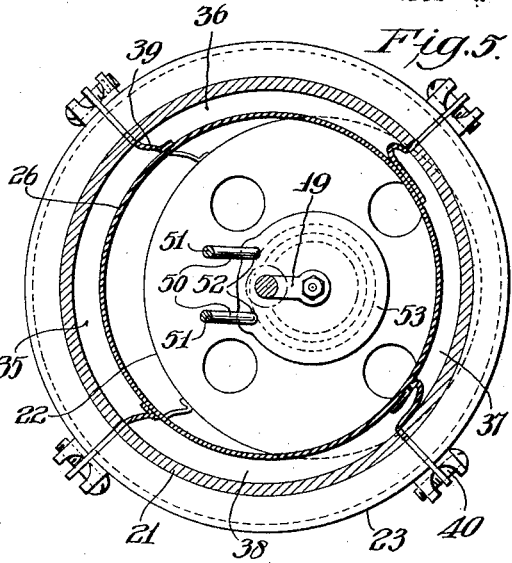
Figure 6:
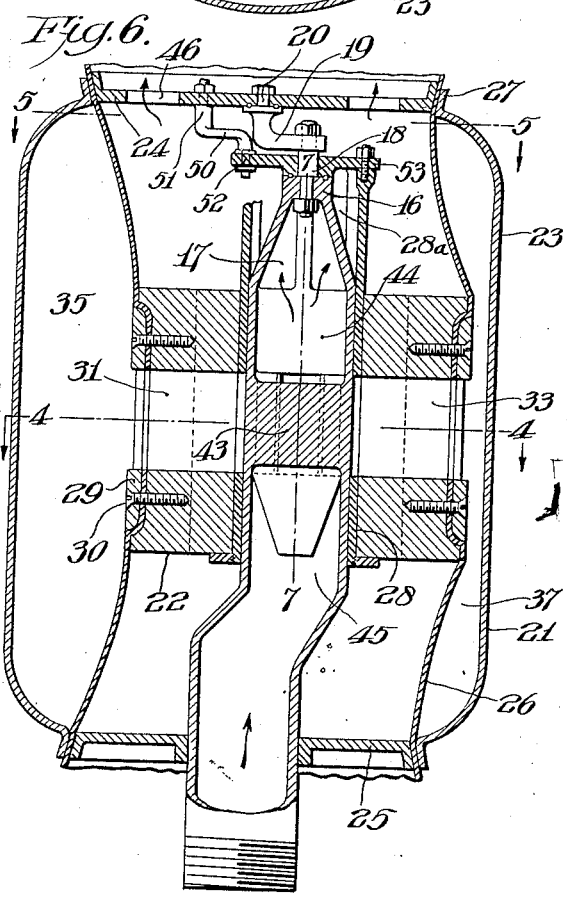

Figures 4 and 5 are horizontal sections through the measuring device of the meter on lines 4—4 and 5—5, respectively, of Fig. 6.

Figure 6 is a vertical section through the measuring device of the meter.

Figure 7:
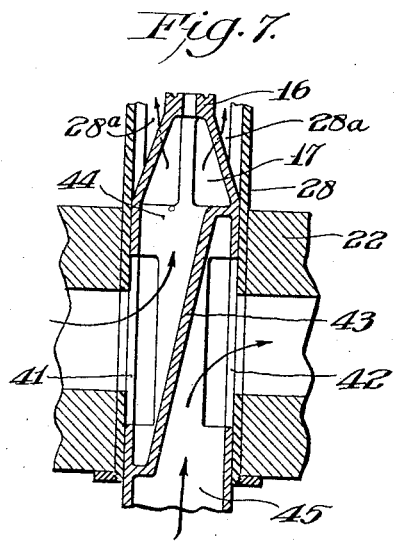

Figure 7 is a sectional detail through the eccentric portion of the gas pipe and adjuncts on line 7—7 of Fig. 6.

Figure 8:
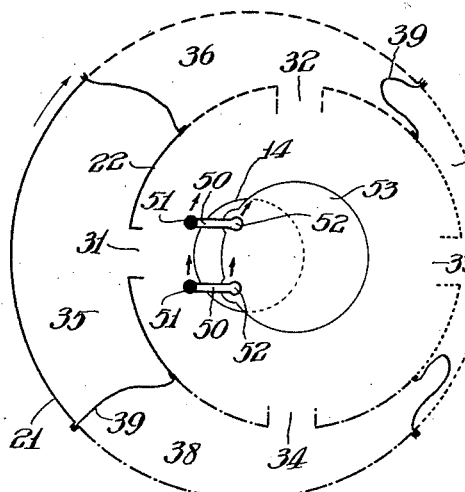
Figure 9:
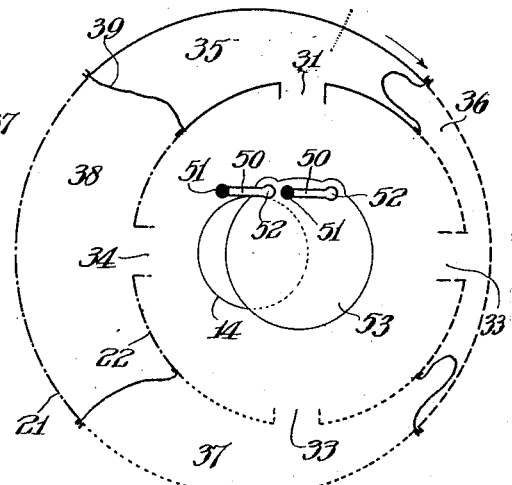
Figure 10:
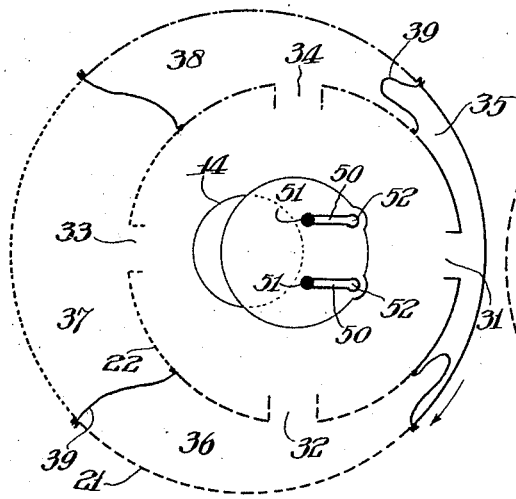
Figure 11:
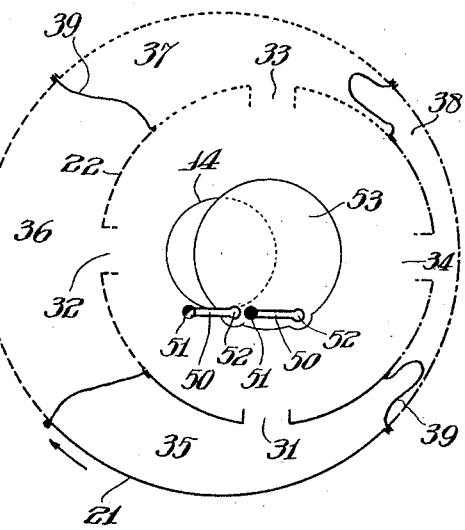

Figures 8, 9, 10 and 11 are diagram views showing four different positions of the parts forming the measuring compartments of the measuring device during one complete revolution of the device; Fig. 8, showing the parts in the position shown in Figs. 4, 5 and 6; and, Figures 9, 10 and 11 each showing the parts advanced a quarter turn from the position shown in the last preceding figure.

Referring to the drawings, the outer or frame casing of the meter comprises a cylindrical body 2 and base 3 and top plate 4 closing the lower and upper ends of the cylindrical body 2 and tie rods 8 connecting the base 3 and top plate 4. This frame casing incloses a gas chamber 9 having a gas outlet pipe 10 extending from the top wall or plate 4 of the gas chamber.

The base 3 incloses a gas inlet chamber 11 which is separate from the gas chamber 9 and which receives gas from a gas inlet pipe 12 extending from the side wall of the chamber 11.

Screwed to the central portion of the base 3 is a gas pipe 13 which communicates with and receives gas from the chamber 11. This pipe 13 extends up into the chamber 9 and it comprises a lower or base portion 14, which is centrally located within the chamber 9, and an upper offset portion 15 having its axis extending parallel with the axis of the base portion 14 and eccentrically arranged with respect thereto. The upper end of the eccentric portion 15 of pipe 13 is contracted and provided with a top wall 16 and gas outlet openings 17 in the contracted portion thereof. Secured to the top wall 16 is a pin 18 which extends upwardly therefrom and has a bracket 19 secured to the upper end thereof. This bracket 19 is provided with a bearing pin 20 which extends in axial alinement with the lower or base portion 14 of the pipe 13.

The pipe 13 carries a rotatable gas measuring device which is located within the gas chamber 9 and which is constructed as follows:

The measuring device includes a casing member 21 and an inner member 22 inclosed within the casing member 21. The casing member 21 comprises a cylindrical body portion 23 and end heads 24 and 25, and, extending through the casing member 21 is a tubular diaphragm 26 which extends from end to end thereof. The end portions of the cylindrical body 23 are contracted and provided with flanges 27 between which and flanges on the end heads 24 and 25 the end portions of the tubular diaphragm are secured. The end heads 24 and 25 of the casing member 21 are rotatably mounted on the bearing pin 20 and the base portion 14 of the pipe 13 so that the casing member may be rotated about the axis thereof.

The inner member 22 is carried by a valve sleeve 28 which is rotatably mounted on the eccentric portion 15 of the pipe 13. This member 22 is located within the central portion of the tubular diaphragm 26 and it is secured thereto by means of blocks 29 held in place by screws 30 and clamping the diaphragm 26 between the blocks 29 and the body of the member 22. The member 22 is provided with four radially disposed openings or passageways 31, 32, 33 and 34 which extend through the tubular diaphragm 26, the securing blocks 29 and the valve sleeve 28. The space between the inner member 22 and the casing member 21 is divided into four compartments 35, 36, 37 and 38 by four equally spaced diaphragms 39, the inner ends of which are connected to the tubular diaphragm 26 and the outer ends of which are connected to the casing member 21, by being clamped between adjacent edge portions of sections of the cylindrical portion 23 of the member 21, such portion being constructed in four separate sections which are secured together by clamping screws or bolts 40 which serve to hold the sections together and clamped diaphragms 39 between them. The ends of the tubular diaphragm 26 are clamped firmly between the outwardly flared flanges of the end heads 24 and 25 and the surrounding similarly flared flanges 27 of the body 23 by eye-bolts 40ª pivoted on upper and lower bolts 40 and extending through lugs on the end heads 24 and 25 and constructed to draw the end heads toward the central portion of the body 23. The diaphragms 26 and 39 may be constructed of leather or other suitable flexible material and the diaphragms 39 may be secured to the diaphragm 26 by sewing or other suitable means.

The outer ends of the passageways 31, 32, and 33 and 34 open into the four compartments 35, 36, 37 and 38, respectively, and the inner ends of the pasasges are adapted to be moved into and out of registry with oppositely disposed openings or ports 41 and 42 in the eccentric portion 15 of the gas pipe. These openings or ports 41 and 42 are separated by a partition wall 43 within the eccentric portion 15 of the pipe. This partition wall 43 not only separates the openings 41 and 42 but it also divides the eccentric portion 15 of the pipe into upper and lower passages 44 and 45, respectively, so that gas ascending through the lower portion of the pipe 13 will be caused to pass out through the opening or port 42 therein and so that gas may enter the passage 44 through the opening or port 41 in the pipe. It will now be understood that gas may pass upwardly through the passage 45 and pipe 13 and out through the port 42 at one side of the partition 43 and that gas may enter the uppper portion of the pipe 13 or passage 44 through the port 41 and pass out from the passage 44 through the openings 17 in the upper contracted end portion of the pipe 13 and into the space inclosed by the tubular diaphragm 26, from which the gas may pass through openings 46 in the end head 24 of the casing member 21 and into the chamber 9.

During the operation of the meter, as will be presently described, the outer and inner members 21 and 22, respectively, are rotated at the same rate of speed in the directions of the arrows in Figs. 4, 5, 8, 9, 10 and 11 by the gas entering the measuring device through the pipe 13 and passing therethrough and out through the openings 46 and into the chamber 9; and, during the rotation of the members 21 and 22 the inner ends of the passages 31, 32, 33 and 34 are moved into and out of registry with the ports 41 and 42 in a certain prescribed order. As shown in Fig. 4 the passage 32 is in communication with the passage 44 through the port 41, the passage 34 is in communication with the passage 45 through the port 42, the valve sleeve 28 is about to open communication between the passage 31 to the port 41 and the valve sleeve 28 is also about to open communication between the passage 33 and the port 42. In this position of the parts gas is entering the compartment 38 through the port 42 and passage 34 and forcing the members 21 and 22 in the direction of the arrows, and gas is being exhausted from the compartment 36 through the passage 32 and port 41. Immediately after the members 21 and 22 move from the position shown in Figs. 4 and 8 the valve sleeve 28 will open the passages 31 and 33 to the ports 41 and 42, respectively, so that then the gas which is within the compartment 35, which is wide open, will begin to exhaust through the passage 31 and port 41, and so that gas will then start to be admitted to the compartment 37 through the port 42 and passage 33. The gas entering the compartment 37 will assist the gas flowing into the compartment 38 in turning members 21 and 22 and exhausting the gas from the compartments 35 and 36 until the parts reach the position shown in Fig. 9.

The passages 31, 32, 33 and 34 of the member 22 are so related to the ports 41 and 42 that during the rotation of the members 21 and 22, the respective passages 31, 32, 33 and 34 are opened to the ports 41 and 42 in alternate succession, each passage remaining open to each port during substantially one half of a complete revolution of the members 21 and 22; therefore it will be understood that gas will be flowing into two of the compartments and out from two of the compartments, substantially at all times during the operation of the meter. The gas enters each compartment during one-half of each revolution of the members 21 and 22, and the gas leaves each compartment during the other half of each revolution of the members 21 and 22; and the gas starts to enter and starts to leave the four measuring compartments 35, 36, 37 and 38, successively, at successive quarter revolutions of the members 21 and 22, and in the order of the numbers designating the compartments, as shown diagrammatically in Figs. 8, 9, 10 and 11.

To preserve the proper relation between the members 21 and 22 and to prevent one from gaining on the other during the rotation thereof I provide a pair of parallel arms 50 each having one end pivoted, at 51, to the head 24 of the member 21, and each having one end pivoted at 52, to a plate 53 which is secured to the top of the valve sleeve 28 and forms, in effect, a part of the sleeve 28 and member 22. The plate 53 is rotatably mounted on the top of the pivot pin 18 and has a bearing on the top wall 16 of the gas pipe 13 to support the valve sleeve 28 and the member 22. The distance between the two pivots 51 and 52 of each arm 50 is the same as the distance between the turning axes of the two members 21 and 22, and, therefore, it will be understood that as the members 21 and 22 are rotated, the arms 50 will assume the four positions shown in Figs. 8, 9, 10 and 11, and intermediate positions between them, and thereby prevent one member from gaining on the other and thus preserve the uniform expansion and contraction of the several measuring compartments 35, 36, 37 and 38.

From the foregoing description it will be understood that the pipe 12 may be connected to a source of gas supply and that the pipe 10 may be connected to a pipe or pipes leading to a gas consuming device or devices, and that gas flowing into the meter, under pressure, through the pipe 12 will enter the chamber 11, pass into the pipe 13 and through the measuring device carried thereby and be discharged from the measuring device into the chamber 9 from which it will pass into the outlet pipe 10. It will also be understood that the gas will be measured as it passes through the measuring compartments 35, 36, 37 and 38 of the measuring device and causes the rotation thereof.

Any suitable recording or indicating mechanism may be geared to the rotating measuring device in any convenient manner to record or indicate the quantity of gas that has passed through it.

I claim as my invention:—

1. The combination of a support, a casing member, means to rotatably support the casing member, an inner member enclosed by the casing member, means to support the inner member to rotate on an axis eccentric to the axis of rotation of the casing member, flexible diaphragms connecting the members and dividing the space between them into a circular series of radially expansible and contractible compartments, and means co-operating with one of said members for admitting pressure fluid to and discharging it from said compartments successively in prescribed order during the rotation of the member.

2. The combination of a support, a casing member, means to rotatably support the casing member, an inner member enclosed by the casing member, means to support the inner member to rotate on an axis eccentric to the axis of rotation of the casing member, flexible diaphragms connecting the members and dividing the space between them into a circular series of radially expansible and contractible compartments, the casing member having end walls opposite to and spaced from the ends of the inner member, the diaphragms extending from the inner member to the end walls of the casing member, and means co-operating with one of said members for admitting pressure fluid to and discharging it from said compartments successively in prescribed order during the rotation of the member.

3. The combination of a support, a casing member, means to rotatably support the casing member, an inner member enclosed by the casing member, means to support the inner member to rotate on an axis eccentric to the axis of rotation of the casing member, flexible diaphragms connecting the members and dividing the space between them into a circular series of radially expansible and contractible compartments, the casing member having end walls opposite to and spaced from the ends of the inner member, the diaphragms extending from the inner member to the end walls of the casing member, means co-operating with one of said members for admitting pressure fluid to and discharging it from said compartments successively in prescribed order during the rotation the member, and positively acting means connecting said members and working independently of the diaphragms and causing the members to rotate in harmony with each other.

4. The combination of a support, a casing member, means to rotatably support the casing member, an inner member enclosed by the casing member, means to support the inner member to rotate on an axis eccentric to the axis of rotation of the casing member, flexible diaphragms connecting the members and dividing the space between them into a circular series of radially expansible and contractible compartments, the casing member having end walls opposite to and spaced from the ends of the inner member, the diaphragms extending from the inner member to the end walls of the casing member, means co-operating with one of said members for admitting pressure fluid to and discharging it from said compartments successively in prescribed order during the rotation of the member, and a pair of spaced arms each having one end pivotally connected to one member and its other end pivotally connected to the other member and causing the members to rotate in harmony with each other.

5. The combination of a support, a pipe extending therefrom and having a base portion and a radially off-set portion provided with a partition, a casing member mounted to rotate on the axis of the base portion of the pipe, an inner member enclosed by the casing member and mounted to rotate on the axis of the off-set portion of the pipe, flexible diaphragms connecting the members and dividing the space between them into a circular series of radially expansible and contractible compartments, and means controlled by said inner member for automatically opening and closing communication between each of said compartments and said pipe on the respective sides of said partition in alternate succession and in prescribed order during the rotation of the members.

6. The combination of a support, a pipe extending therefrom and having a base portion and a radially off-set portion provided with a partition and an outlet opening on one side of the partition and an inlet opening on the other side of the partition, a casing member mounted to rotate on the axis of the base portion of the pipe, an inner member enclosed by the casing member and mounted to rotate on the axis of the off-set portion of the pipe, flexible diaphragms connecting the members and dividing the space between them into a circular series of radially expansible and contractible compartments, said inner member having gas passages therein corresponding in number with and opening into said compartments, and said inner member being provided with a part having ports at the inner ends of said passages arranged to connect said passages successively with said openings in alternate succession during the rotation of the member.

In testimony whereof I affix my signature.

LAWRENCE OLSEN.